United States Patent
Jang et al.

(10) Patent No.: US 11,632,232 B2
(45) Date of Patent: Apr. 18, 2023

(54) STORAGE CONTROLLER, SYSTEM INCLUDING THE SAME, AND METHOD OF OPERATING THE SAME

(71) Applicant: SAMSUNG ELECTRONICS CO., LTD., Suwon-si (KR)

(72) Inventors: Jaehun Jang, Hwaseong-si (KR); Youngsik Moon, Hwaseong-si (KR); Wijik Lee, Suwon-si (KR); Hongrak Son, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 17/167,203

(22) Filed: Feb. 4, 2021

(65) Prior Publication Data
US 2022/0021515 A1 Jan. 20, 2022

(30) Foreign Application Priority Data
Jul. 16, 2020 (KR) .......................... 10-2020-0088104

(51) Int. Cl.
*H04L 9/00* (2022.01)
*H04L 9/08* (2006.01)

(52) U.S. Cl.
CPC ............ *H04L 9/008* (2013.01); *H04L 9/0825* (2013.01); *H04L 9/0827* (2013.01); *H04L 2209/34* (2013.01)

(58) Field of Classification Search
CPC ..... H04L 9/008; H04L 9/0825; H04L 9/0827; H04L 2209/34; H04L 9/00; H04L 9/08
See application file for complete search history.

(56) References Cited

U.S. PATENT DOCUMENTS 8,285,972 B2 * 10/2012 Wilson .................... G09C 1/00
 711/220
9,760,737 B2 9/2017 Cammarota et al.
(Continued)

FOREIGN PATENT DOCUMENTS

KR 10-1341709 B1 12/2013
KR 10-1832861 B1 4/2018

OTHER PUBLICATIONS

Communication dated Jul. 15, 2021 issued by the European Intellectual Property Office in counterpart European Application No. 21157866.1.

*Primary Examiner* — Quazi Farooqui
(74) *Attorney, Agent, or Firm* — Sughrue Mion, PLLC

(57) ABSTRACT

A client system includes a client-side host device, and a client-side storage device including a storage controller and a storage memory. The storage controller includes a host interface, a processor configured to control a read operation and a write operation for the storage memory, and a homomorphic encryption and decryption accelerator configured to, based on receiving a read request from the client-side host device, perform homomorphic encryption on first plaintext data that is read from the storage memory, to generate first homomorphic ciphertext data, and provide the first homomorphic ciphertext data to the client-side host device through the host interface, and based on receiving a write request from the client-side host device, perform homomorphic decryption on second homomorphic ciphertext data that is received through the host interface, to generate second plaintext data, and write the second plaintext data in the storage memory.

18 Claims, 12 Drawing Sheets

(56) References Cited

U.S. PATENT DOCUMENTS

| | | |
|---|---|---|
| 10,255,454 B2 | 4/2019 | Kamara et al. |
| 10,298,385 B2 | 5/2019 | Khedr et al. |
| 2015/0358153 A1 | 12/2015 | Gentry |
| 2018/0359079 A1 | 12/2018 | Hu et al. |
| 2019/0268135 A1 | 8/2019 | Khedr et al. |
| 2019/0363871 A1 | 11/2019 | Cheon et al. |
| 2020/0019867 A1 | 1/2020 | Nandakumar et al. |
| 2020/0036510 A1 | 1/2020 | Gomez et al. |
| 2020/0036511 A1 | 1/2020 | Cheon et al. |
| 2020/0127810 A1* | 4/2020 | Hiromasa ................ G09C 1/00 |
| 2020/0134207 A1* | 4/2020 | Doshi .................. H04L 9/0637 |
| 2020/0394518 A1* | 12/2020 | Sirdey ................... H04L 9/008 |

* cited by examiner

STORAGE CONTROLLER, SYSTEM INCLUDING THE SAME, AND METHOD OF OPERATING THE SAME

CROSS-REFERENCE TO RELATED APPLICATION

This application is based on and claims priority under 35 USC § 119 to Korean Patent Application No. 10-2020-0088104, filed on Jul. 16, 2020, in the Korean Intellectual Property Office, the disclosure of which is incorporated by reference herein in its entirety.

BACKGROUND

1. Field

The disclosure relates to homomorphic encryption and decryption technology, and more particularly to a storage controller for performing the homomorphic encryption and decryption, a system including the storage controller, and a method of operating the storage controller.

2. Description of Related Art

A homomorphic encryption and decryption technology is an encryption technology that supports operations such as computation, search and analysis in an encrypted state. Recently, as leakage of personal information becomes a problem, an importance of the homomorphic encryption and decryption technology is more emphasized. However, a size of a homomorphic ciphertext data that is encrypted according to the homomorphic encryption and decryption technology reaches several tens of times a size of plaintext data before homomorphic encryption, and a computational complexity of operations supported by the homomorphic encryption and decryption technology is also very high. Furthermore, security problems may also occur in a process of transmitting plaintext data or ciphertext data to encrypt plaintext data or decrypt ciphertext data by applying the homomorphic encryption technology.

SUMMARY

Provided are a storage controller, a system including the storage controller, and a method of operating the storage controller, which are capable of enhancing security and reducing a burden associated with transmission of homomorphic ciphertext data.

According to example embodiments, a client system includes a client-side host device, and a client-side storage device including a storage controller and a storage memory. The storage controller includes a host interface, a processor configured to control a read operation and a write operation for the storage memory, and a homomorphic encryption and decryption accelerator configured to, based on receiving a read request from the client-side host device, perform homomorphic encryption on first plaintext data that is read from the storage memory, to generate first homomorphic ciphertext data, and provide the first homomorphic ciphertext data to the client-side host device through the host interface, and based on receiving a write request from the client-side host device, perform homomorphic decryption on second homomorphic ciphertext data that is received through the host interface, to generate second plaintext data, and write the second plaintext data in the storage memory.

According to example embodiments, a storage controller includes a host interface, a processor configured to control a read operation and a write operation for a storage memory, and a homomorphic encryption and decryption accelerator configured to, based on receiving a read request from a client-side host device, perform homomorphic encryption on first plaintext data that is read from the storage memory, to generate first homomorphic ciphertext data, and provide the first homomorphic ciphertext data to the client-side host device through the host interface, and based on receiving a write request from the client-side host device, perform homomorphic decryption on second homomorphic ciphertext data that is received through the host interface, to generate second plaintext data, and write the second plaintext data in the storage memory.

According to example embodiments, a method of operating a storage controller, includes receiving, by a homomorphic encryption and decryption accelerator, a read request from host device, based on the read request received from the host device being for transmitting data that is stored in a storage memory to a server system, reading, by the homomorphic encryption and decryption accelerator, data from the storage memory through a first path that performs homomorphic encryption, and based on the read request received from the host device not being for transmitting the data to the server system, reading, by the homomorphic encryption and decryption accelerator, data from the storage memory through a second path that does not perform the homomorphic encryption.

BRIEF DESCRIPTION OF THE DRAWINGS

The above and other aspects, features, and advantages of embodiments of the disclosure will be more apparent from the following description taken in conjunction with the accompanying drawings.

DETAILED DESCRIPTION OF THE EMBODIMENTS

Figure 1:
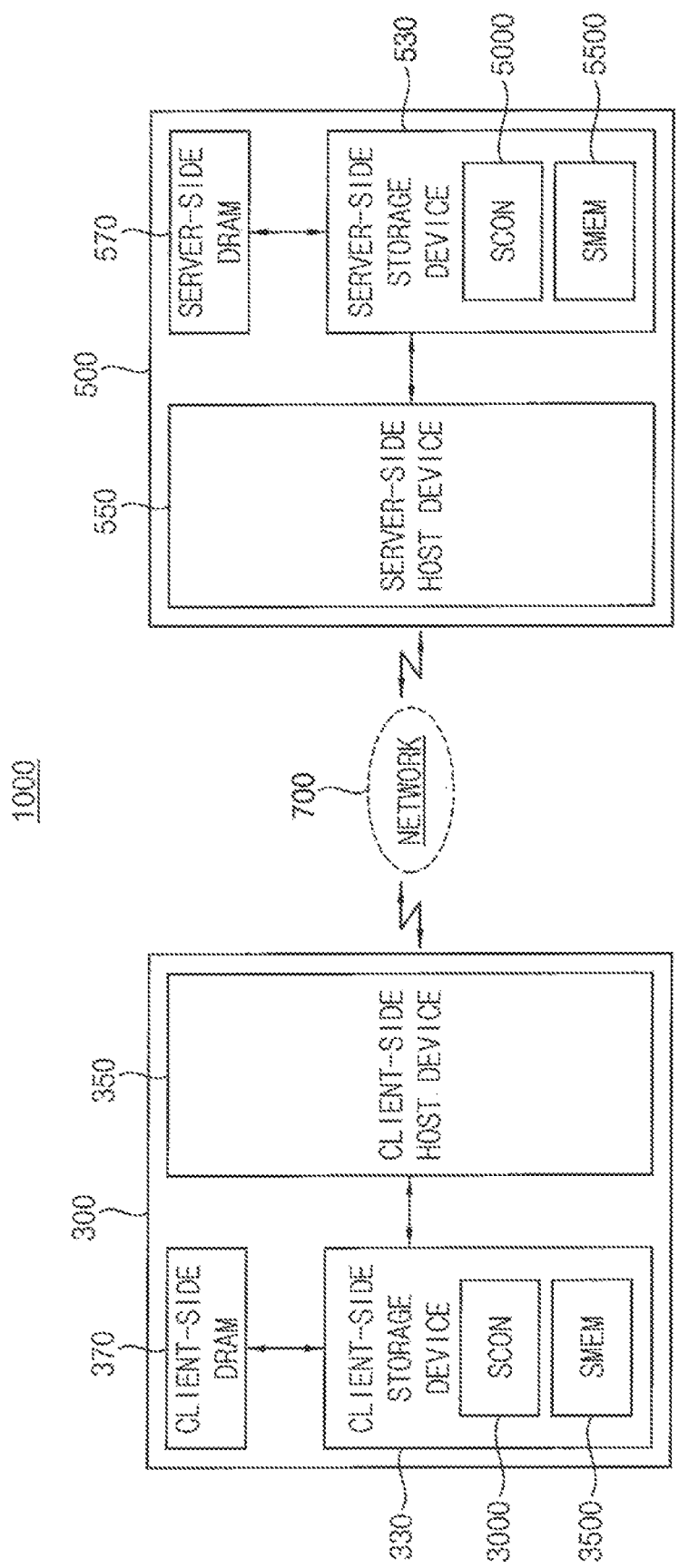
FIG. 1 is a block diagram illustrating a system according to example embodiments.

Example embodiments will be described more fully hereinafter with reference to the accompanying drawings, in which the example embodiments are shown. In the drawings, like numerals refer to like elements throughout. The repeated descriptions may be omitted.

The example embodiments include a storage controller, a system including the storage controller and a method of operating the storage controller that perform a homomorphic encryption, a homomorphic decryption and a homomorphic operation. In this case, because a public key, a secret key, and other parameters for performing the homomorphic encryption technology are not leaked to outside of a client-side storage device, security of the system performing the homomorphic encryption technology may be strengthened. In addition, by minimizing a number of times of transmission of homomorphic ciphertext data having an increased size, a burden associated with the transmission of the homomorphic ciphertext data may be reduced.

FIG. 1 is a block diagram illustrating a system according to example embodiments.

Referring to FIG. 1, a system 1000 includes a client system 300, a server system 500 and a network 700. The system 1000 performs homomorphic encryption and decryption technology.

The homomorphic encryption and decryption technology refers to an encryption technology that supports a value obtained by performing encryption after performing operation for plaintexts and a value obtained by performing the operation after performing encryption for each of the plaintexts to represent a same result value. The homomorphic encryption and decryption technology refers to an encryption technology which satisfies Equation 1 below.

$$OP(E(PD))=E(OP(PD))  \quad [\text{Equation 1}]$$

In Equation 1, the PD is plaintext data obtained by converting the plaintext to data, the E( ) is a function which performs the encryption, and the OP( ) is a function which performs the operation. When the operation corresponds to addition or multiplication, the homomorphic encryption and decryption technology may satisfy Equation 2 or 3 below.

$$E(PD1)+E(PD2)=E(PD1+PD2) \quad [\text{Equation 2}]$$

$$E(PD1)*E(PD2)=E(PD1*PD2) \quad [\text{Equation 3}]$$

The client system 300 and the server system 500 communicate with each other through the network 700. The client system 300 may request or transmit data to the server system 500, and the server system 500 may also request or transmit data to the client system 300.

In some embodiments, data transmitted by the client system 300 and the server system 500 through the network 700 is homomorphic ciphertext data encrypted by applying a homomorphic encryption and decryption technology. The client system 300 may homomorphic encrypt the plaintext data to generate homomorphic ciphertext data, and transmit the homomorphic ciphertext data to the server system 500. The server system 500 may receive and store the homomorphic ciphertext data from the client system 300, and then perform a homomorphic operation on the homomorphic ciphertext data. The server system 500 may transmit the homomorphic ciphertext data on which the homomorphic operation has been performed to the client system 300, and the client system 300 may generate plaintext data by perform a homomorphic decrypting on the transmitted homomorphic ciphertext data.

The client system 300 includes a client-side storage device 330, a client-side host device 350, and a client-side dynamic random access memory (DRAM) 370. The client-side storage device 330 includes a storage controller (SCON) 3000 and a storage memory (SMEM) 3500. The client-side host device 350 controls the client-side storage device 330, and the storage controller 3000 controls the client-side DRAM 370 and the storage memory 3500 under a control of the client-side host device 350.

The server system 500 includes a server-side storage device 530, a server-side host device 550, and a server-side DRAM 570. The server-side storage device 530 includes a SCON 5000 and a SMEM 5500. The server-side host device 550 controls the server-side storage device 530, and the storage controller 5000 controls the server-side DRAM 570 and the storage memory 5500 under a control of the server-side host device 550.

The homomorphic encryption and decryption technology has security that may be mathematically proved. In some embodiments, the homomorphic encryption, the homomorphic decryption and the homomorphic operation according to the homomorphic encryption and decryption technology may be defined based on a finite ring based on a lattice problem. In this case, because an algorithm for efficiently solving the homomorphic encryption and decryption technology has not been know until now, when the plaintext data is encrypted according to the homomorphic encryption and decryption technology to generated the homomorphic ciphertext data, the security of the homomorphic ciphertext data may be guaranteed.

However, a public key, a secret key and other parameters that may be required for the client system 300 to perform homomorphic encryption and decryption according to the homomorphic encryption and decryption technology may be temporarily stored in the client-side storage device 330 included in the client system 300 as well as the client-side host device 350 and the client-side DRAM 370. In this case, the security of the homomorphic ciphertext data may be compromised according to a problem of implementing the homomorphic encryption and decryption technology rather than the homomorphic encryption and decryption technology itself. This problem may also occur in the process of the server system 500 performing the homomorphic operation on the homomorphic ciphertext data.

However, the client system 300 and the server system 500 according to example embodiments perform the homomorphic encryption, the homomorphic decryption or the homomorphic operation inside the storage controllers 3000 and 5000 implementing the homomorphic encryption and decryption technology. In this case, because the public key, the secret key and the other parameters for performing the homomorphic encryption and decryption technology are not leaked to the outside of the client-side storage device 330, the security of the system 1000 for performing the homomorphic encryption and decryption technology may be strengthened. It will be described in more detail below.

Figure 2:
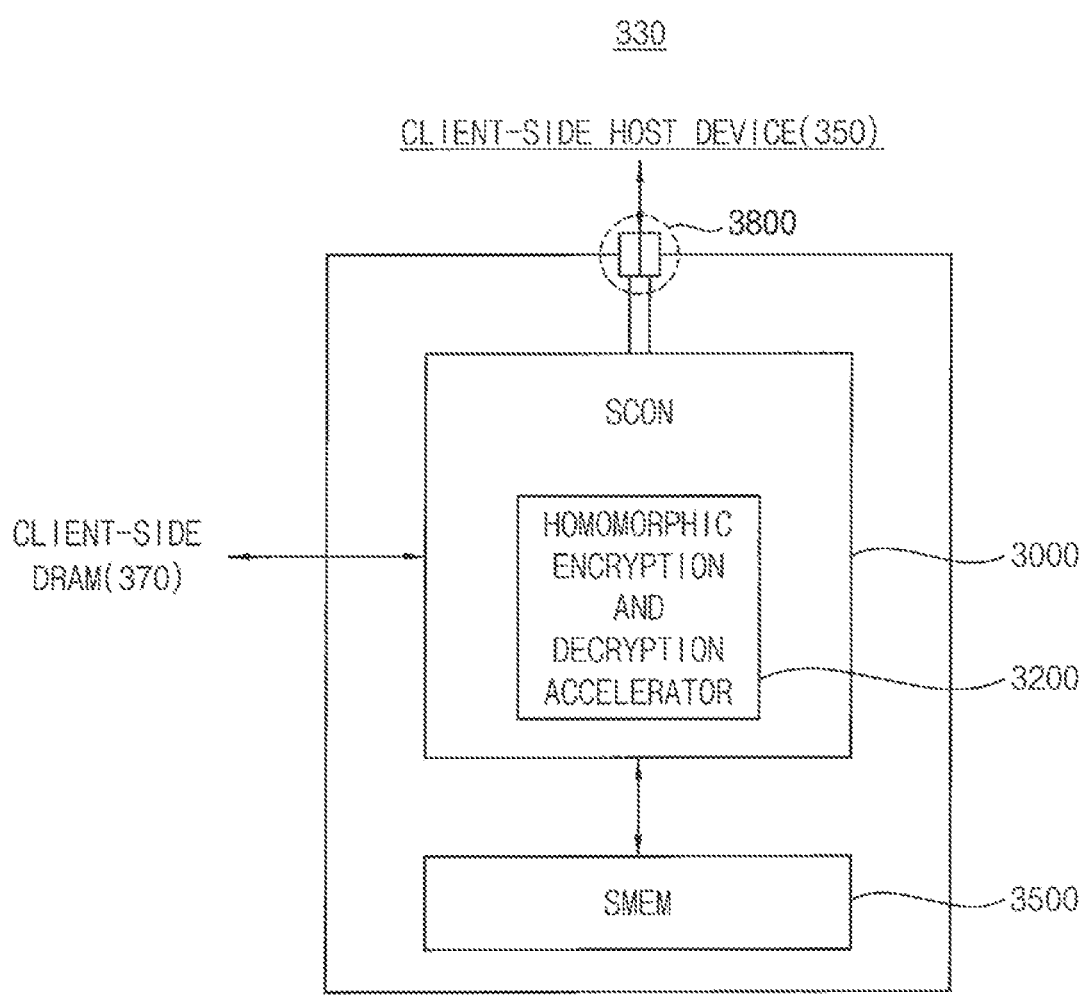
FIG. 2 is a block diagram illustrating an embodiment of a client-side storage device illustrated in FIG. 1.

FIG. 2 is a block diagram illustrating an embodiment of a client-side storage device illustrated in FIG. 1.

Referring to FIG. 2, the client-side storage device 330 includes a storage controller 3000, a storage memory 3500 and a connector 3800.

The storage controller 3000 overall controls the client-side storage device 330 under the control of the client-side host device 350. In some embodiments, the storage controller 3000 controls a read operation and a write operation for the storage memory 3500 or the client-side DRAM 370. However, the scope of the example embodiments is not limited thereto.

In some embodiments, the storage controller 3000 may control a homomorphic encryption and a homomorphic decryption, a memory error control operation, a randomizer, a read level control and other signal processing operations.

The memory error control operation refers to an operation of controlling a program error, a program/erase error of data stored in the storage memory 3500, an error occurring due to leakage of electric charges stored in the floating gate and a read error. The randomizer refers to an operation of mitigating a reduction in reliability due to a back pattern dependency or a coupling phenomenon when data stored in the storage memory 3500 exhibits a regular pattern or data exhibits a continuous pattern. The read level control refers to an operation of controlling an error occurring according to a read method of data stored in the storage memory 3500. The other signal processing operations may include a coded modulation for improving reliability of the storage memory 3500. However, the scope of the example embodiments is not limited thereto. The homomorphic encryption and decryption operation will be described later.

In some embodiments, when a read request is issued from the client-side host device 350, the storage controller 3000 may read the read-requested data from the storage memory 3500 or the client-side DRAM 370, and when a write request is issued from the client-side host device 350, the storage controller 3000 may write the write-requested data in the storage memory 3500 or the client-side DRAM 370. In some embodiments, the storage controller 3000 may be connected to the client-side host device 350.

The storage memory 3500 or the client-side DRAM 370 stores write data transmitted from the client-side host device 350 under the control of the storage controller 3000. In some embodiments, the storage memory 3500 may include a plurality of nonvolatile memories. For example, each of the plurality of nonvolatile memories may include an EEPROM (Electrically Erasable Programmable Read-Only Memory), PRAM (Phase Change Random Access Memory), RRAM (Resistance Random Access Memory), NFGM (Nano Floating Gate Memory), PoRAM (Polymer Random Access Memory), Magnetic Random Access Memory (MRAM), Ferroelectric Random Access Memory (FRAM), or similar memory. In some embodiments, the client-side DRAM 370 may include a plurality of DRAMs as volatile memory.

The storage controller 3000 further includes a homomorphic encryption and decryption accelerator 3200. The homomorphic encryption and decryption accelerator 3200 may generate homomorphic ciphertext data by performing homomorphic encryption on plaintext data, and generate plaintext data by performing homomorphic decryption on the homomorphic ciphertext data. It will be described in more detail below.

Figure 3:
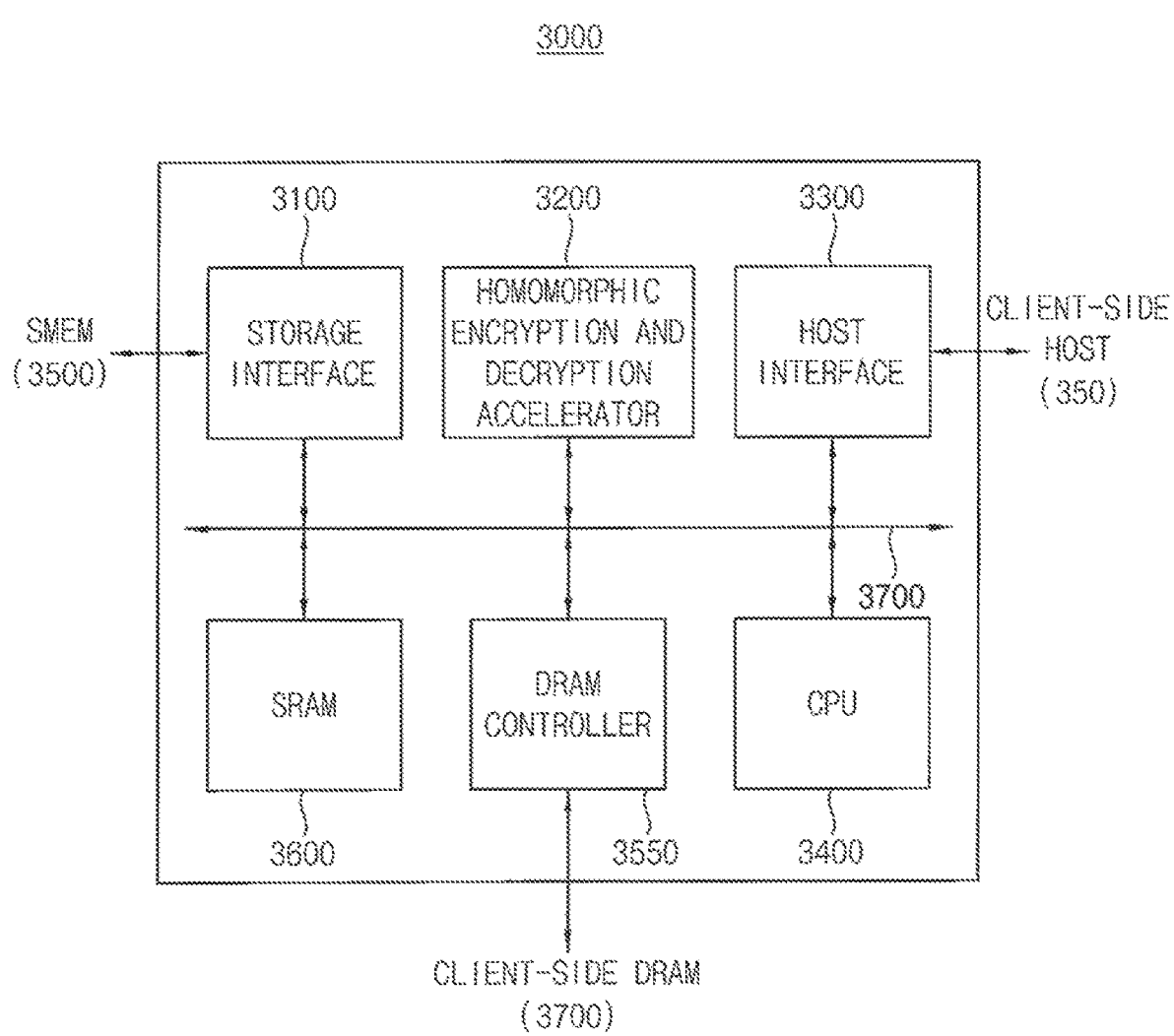
FIG. 3 is a block diagram illustrating an embodiment of a storage controller illustrated in FIG. 2.

FIG. 3 is a block diagram illustrating an embodiment of a storage controller illustrated in FIG. 2.

Referring to FIGS. 2 and 3, the storage controller 3000 includes a storage interface 3100, a homomorphic encryption and decryption accelerator 3200, a host interface 3300, a processor (Central Processing Unit)(CPU) 3400, a dynamic random access memory (DRAM) controller 3550, a static random access memory (SRAM) 3600 and a main bus 3700.

The storage interface 3100 performs communication between the storage controller 3000 and the storage memory 3500. The host interface 3300 performs communication between the storage controller 3000 and the client-side host device 350. The main bus 3700 performs communication between the components 3100, 3200, 3300, 3400, 3550 and 3600 included in the storage controller 3000. The homomorphic encryption and decryption accelerator 3200 may generate homomorphic ciphertext data by performing homomorphic encryption on plaintext data, or generate plaintext data by performing homomorphic decryption on homomorphic ciphertext data.

In FIG. 3, the homomorphic encryption and decryption accelerator 3200 is illustrated as a module separate from the host interface 3300, but the scope of the example embodiments is not limited thereto. In some embodiments, the homomorphic encryption and decryption accelerator 3200 may be implemented inside the host interface 3300.

The processor 3400 controls a read operation and a write operation for the storage memory 3500, and may perform the memory error control, the randomizer, the read level control and the other signal processing operations described above with reference to FIG. 2. However, the scope of the example embodiments is not limited thereto.

The memory error control, the randomizer, the read level control, and the other signal processing operations may be implemented and performed as a separate module different from the processor 3400. In some embodiments, the processor 3400 may control a transmission path of data transmitted between the storage memory 3500 and the client-side host device 350 in the process of performing the read operation and the write operation. It will be described in more detail below.

Figure 4:
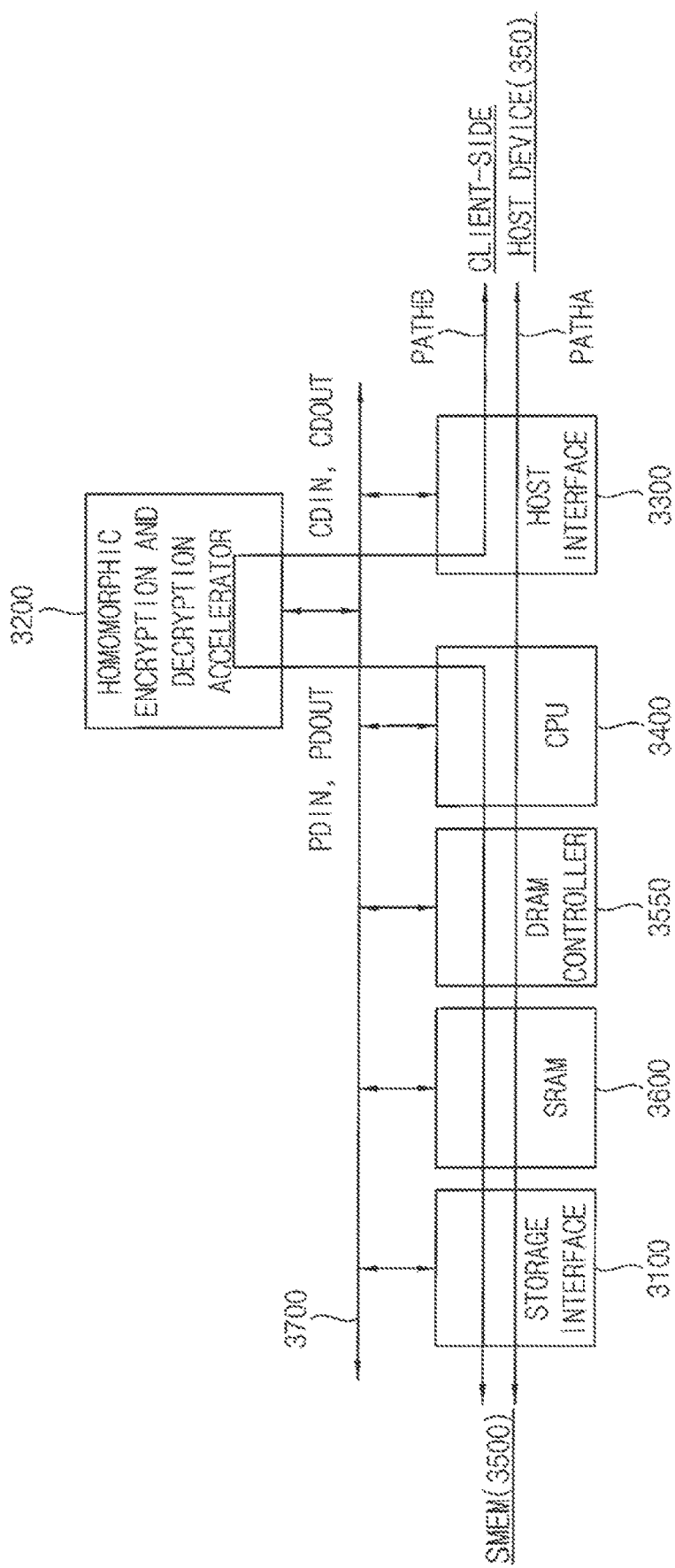
FIG. 4 is a diagram for describing a process in which a processor illustrated in FIG. 3 controls a transmission path of data.

FIG. 4 is a diagram for describing a process in which a processor illustrated in FIG. 3 controls a transmission path of data.

In FIG. 4, components 3100, 3200, 3300, 3400, 3550, 3600 and 3700 of the storage controller 3000 are illustrated. Each of the components 3100, 3200, 3300, 3400, 3550, 3600 and 3700 are the same components as the components illustrated in FIG. 3, but are illustrated by changing their positions for convenience of description. And the path A PATHA and the path B PATHB are illustrated.

Referring to FIGS. 2 to 4, the path A and the path B represent transmission paths of data transmitted between the storage memory 3500 and the client-side host device 350. However, the scope of the example embodiments is not limited thereto. The path A represents a transmission path of data passing through the storage interface 3100, the SRAM 3600, the DRAM controller 3550, the processor 3400 and the host interface 3300. The path B represents a transmission path of data further passing through the components 3100, 3300, 3400, 3550 and 3600 on the path A as well as the homomorphic encryption and decryption accelerator 3200.

That is, the path A may be a transmission path which does not pass through the homomorphic encryption and decryption accelerator 3200, and the path B may be a transmission path which passes through the homomorphic encryption and decryption accelerator 3200.

In some embodiments, the path A may include a case in which data transmitted from the storage memory 3500 stays in the storage controller 3000 without being transmitted to the client-side host device 350. In addition, the path A may also include a case in which data transmitted from the client-side host device 350 stays in the storage controller 3000 without being transmitted to the storage memory 3500.

In some embodiments, the path B may be a path generated when the client-side host device 350 issues a read request to the storage controller 3000 for the purpose of transmitting data stored in the storage memory 3500 to outside of the client-side storage device 330. In the opposite interpretation, the path A may be a path generated when the client-side host device 350 issues a read request to the storage controller 3000 for the purpose other than the purpose of transmitting data stored in the storage memory 3500 to outside of the client-side storage device 330.

In some embodiments, the path B may be a path generated when the client-side host device 350 issues a write request to the storage controller 3000 for the purpose of writing data received from outside of the client-side storage device 330 in the storage memory 3500. In the opposite interpretation, the path A may be a path generated when the client-side host device 350 issues a write request to the storage controller 3000 for the purpose other than the purpose of writing data received from outside of the client-side storage device 330 in the storage memory 3500.

In some embodiments, the order in which the path B passes through the homomorphic encryption and decryption accelerator 3200 among the components 3100, 3200, 3300, 3400, 3550 and 3600 may be just before the host interface 3300 performing communication between the storage controller 3000 and the client-side host device 350. In this case, on the path B, the homomorphic encryption and decryption accelerator 3200 may be adjacent to the host interface 3300.

Figure 5:
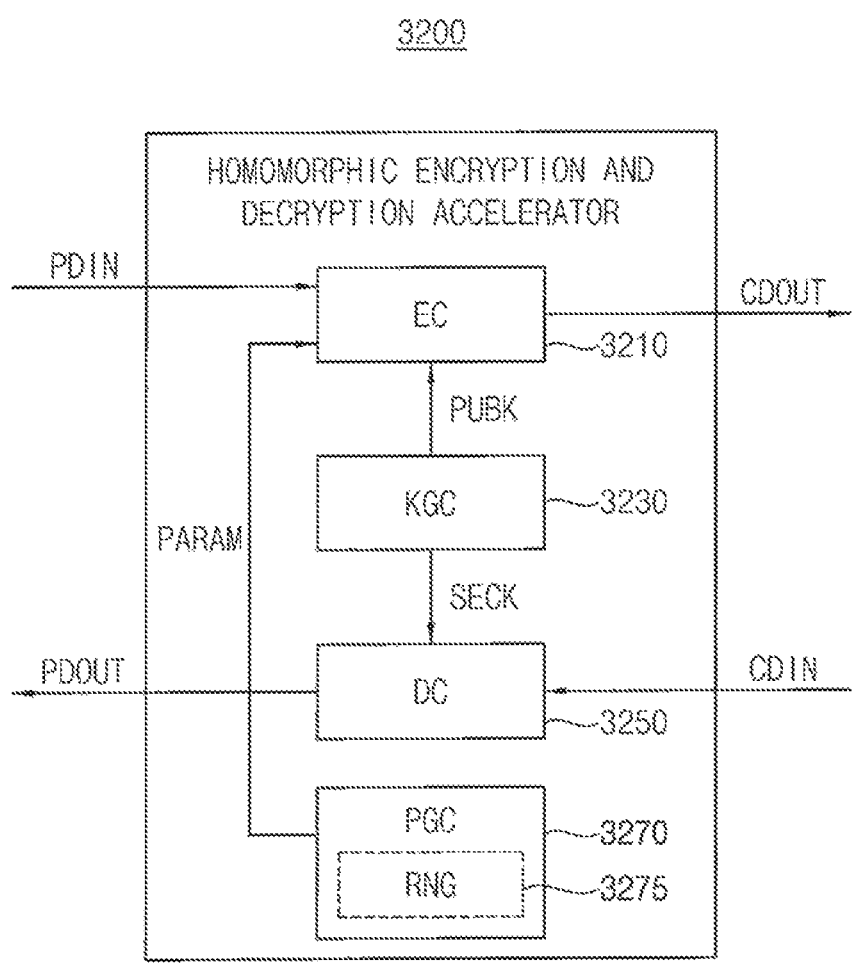
FIG. 5 is a block diagram illustrating an embodiment of a homomorphic encryption and decryption accelerator illustrated in FIGS. 2 to 4.

FIG. 5 is a block diagram illustrating an embodiment of a homomorphic encryption and decryption accelerator illustrated in FIGS. 2 to 4.

Referring to FIG. 5, the homomorphic encryption and decryption accelerator 3200 includes an encryption circuit (EC) 3210, a key generation circuit (KGC) 3230, a decryption circuit (DC) 3250 and a parameter generation circuit (PGC) 3270.

The encryption circuit 3210 receives plaintext data PDIN from outside, receives a public key PUBK from the key generation circuit 3230, and receives parameters PARAM from the parameter generation circuit 3270. The encryption circuit 3210 generated homomorphic ciphertext data CDOUT by performing homomorphic encryption on the plaintext data PDIN based on the public key PUBK and the parameter PARAM.

The key generation circuit 3230 generates a public key PUBK used in the homomorphic encryption process and a secret key SECK used in the homomorphic decryption process.

The decryption circuit 3250 receives the homomorphic ciphertext data CDIN from outside, and receives the secret key SECK from the key generation circuit 3230. The decryption circuit 3250 generates plaintext data PDOUT by performing homomorphic decryption on the homomorphic ciphertext data CDIN based on the secret key SECK.

The parameter generation circuit 3270 generates parameters PARAM used in the homomorphic encryption process and the homomorphic decryption process. In some embodiment, parameters PARAM used in the homomorphic encryption process may be different from parameters PARAM used in the homomorphic decryption process. In some embodiments, the number of parameters PARAM may be plural, but the scope of the example embodiments is not limited thereto.

In some embodiments, the parameter PARAM may be generated based on the homomorphic encryption scheme adopted by the homomorphic encryption and decryption accelerator 3200. The homomorphic encryption scheme may be classified from various viewpoints. For example, the homomorphic encryption scheme may be one of a partial homomorphic encryption, a somewhat homomorphic encryption and a fully homomorphic encryption. The partial homomorphic encryption may only support some operations between ciphertexts, the somewhat homomorphic encryption may support a limited number of operations between the ciphertexts, and the fully homomorphic encryption may support an unlimited number of operations between the ciphertexts. However, in some embodiments, the homomorphic encryption scheme may be one of digitwise homomorphic encryption and bitwise homomorphic encryption.

In some embodiments, the parameter PARAM may include parameters related to a encoding, a decoding, a multi-message packing, a homomorphic encryption, a homomorphic decryption and a key generation, but the scope of the example embodiments is not limited thereto. In some embodiments, the parameter PARAM may further include parameters related to a digit adjustment or a key switching.

The parameter generation circuit 3270 may include a random number generator (RNG) 3275. It will be described in more detail below.

Figure 6:
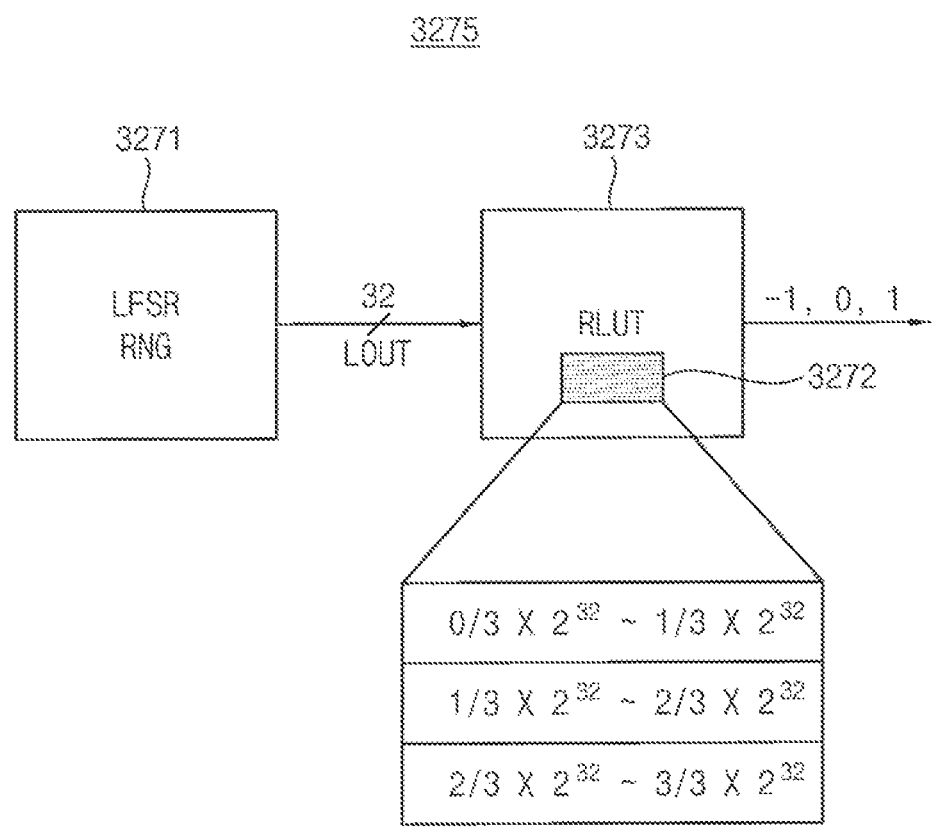
FIG. 6 is a block diagram illustrating an embodiment of a random number generator illustrate in FIG. 5.

FIG. 6 is a block diagram illustrating an embodiment of a random number generator illustrate in FIG. 5.

Referring to FIG. 6, the random number generator 3275 includes a linear feedback shift register ring oscillator (LFSR RNG) 3271 and a random number provider 3273. In some embodiments, the LFSR RNG 3271 may include a shift register and an XOR logic gate.

The LFSR RNG 3271 generates a 32-bit output signal LOUT representing values from 0 to 232 and transmits the generated 32-bit output signal LOUT to the random number provider 3273. In some embodiments, the LFSR RNG 3271 may generate the output signal LOUT based on any one or any combination of a FTP (File Transfer Protocol) connection time, a inter processor communication (IPC) time, an external temperature, a link-up time of interface, i.e., the host interface 3300 or the storage interface 3100 illustrated in FIG. 3.

The random number provider 3273 generates a random number based on the output signal LOUT. In some embodiment, the random number provider 3273 may generate a value of '−1', '0' or '1' as the random number. In some embodiments, the random number provider 3273 may generate '−1' when the output signal LOUT is greater than or equal to 0 and less than $\frac{1}{3}*2^{32}$, generate '0' when the output signal LOUT is greater than or equal to $\frac{1}{3}*2^{32}$ and less than $\frac{2}{3}*2^{32}$, and generate '1' when the output signal LOUT is greater than or equal to $\frac{1}{3}*2^{32}$ and less than $3/3*2^{32}$, but the scope of the example embodiments is not limited thereto.

In some embodiments, the random number generator 3275 may include a reference lookup table (RLUT) 3272.

Figure 7:
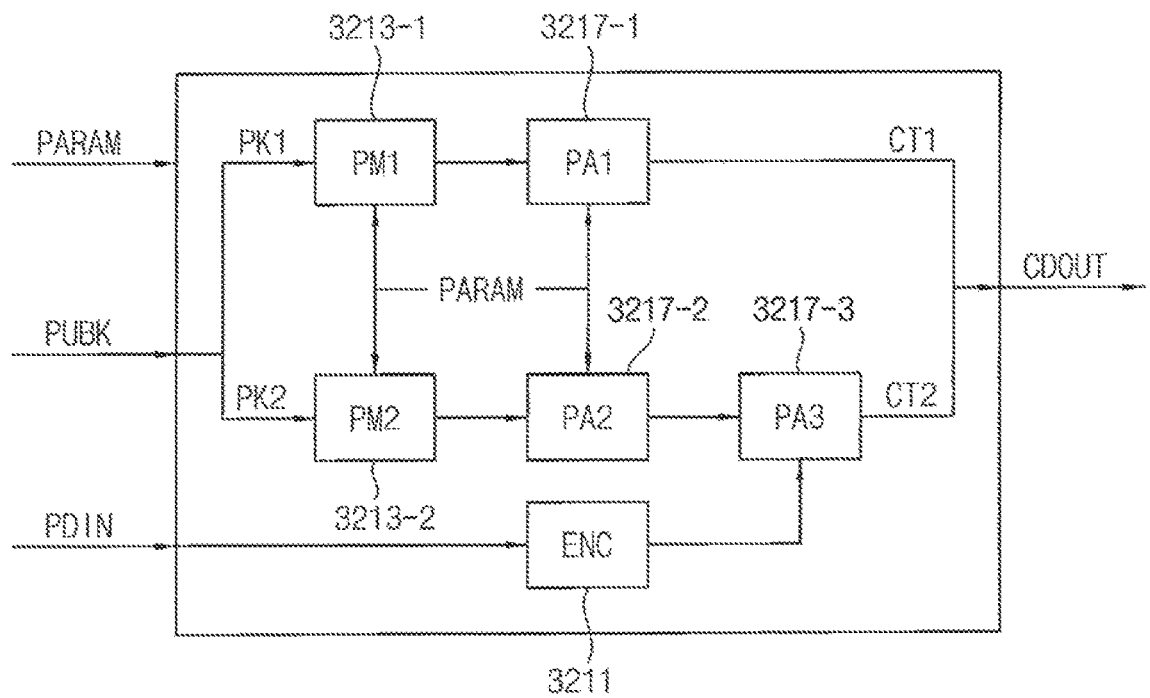
FIG. 7 is a block diagram illustrating an embodiment of an encryption circuit illustrated in FIG. 5.

FIG. 7 is a block diagram illustrating an embodiment of an encryption circuit illustrated in FIG. 5.

Referring to FIG. 7, the encryption circuit 3210 includes polynomial multipliers (PM1 and PM2) 3213-1 and 3213-2, polynomial adders (PA1, PA2 and PA3) 3217-1, 3217-2 and 3217-3 and an encoder (ENC) 3211.

The encryption circuit 3210 receives plaintext data PDIN, public keys PUBK and parameters PARAM. In some embodiments, the number of the public keys PUBK may be plural, the public keys may include a first public key PK1 and a second public key PK2. In some embodiments, the parameter PARAM may be input to the polynomial multipliers 3213-1 and 3213-2 and the polynomial adders 3217-1, 3217-2 and 3217-3. However, the scope of the example embodiments is not limited thereto.

The polynomial multiplier 3213-1 receives the first public key PK1 and the parameter PARAM and provides the result of performing the polynomial multiplication operation to the polynomial adder 3217-1. The polynomial multiplier 3213-2 receives the second public key PK2 and the parameter PARAM and provides the result of performing the polynomial multiplication operation to the polynomial adder 3217-2.

The polynomial adder 3217-1 receives the result data performed by the polynomial multiplier 3213-1 and the parameter PARAM and provides the result of performing the polynomial addition operation as first homomorphic ciphertext data CT1. The polynomial adder 3217-2 receives the result data performed by the polynomial multiplier 3213-2 and the parameter PARAM and provides the result of performing the polynomial addition operation to the polynomial adder 3217-3. The encoder 3211 receives and encodes the plaintext data PDIN, and provides the result data of the encoding to the polynomial adder 3217-3. The polynomial adder 3217-3 receives the result of the operation performed by the polynomial adder 3217-2 and the encoder 3211, and provides the result of performing the polynomial addition operation as second homomorphic ciphertext data CT2.

That is the first homomorphic ciphertext data CT1 and the second homomorphic ciphertext data CT2 may be generated according to Equations 4 and 5 below.

$$CT1=PK1*PARAM1+PARAM2 \quad \text{[Equation 4]}$$

$$CT2=PK2*PARAM1+PARAM3+INC(PDIN) \quad \text{[Equation 5]}$$

In Equations 4 and 5, the INC( ) is an encoding function. PARAM1, PARAM2 and PARAM3 are random numbers included in the parameter PARAM.

Figure 8:
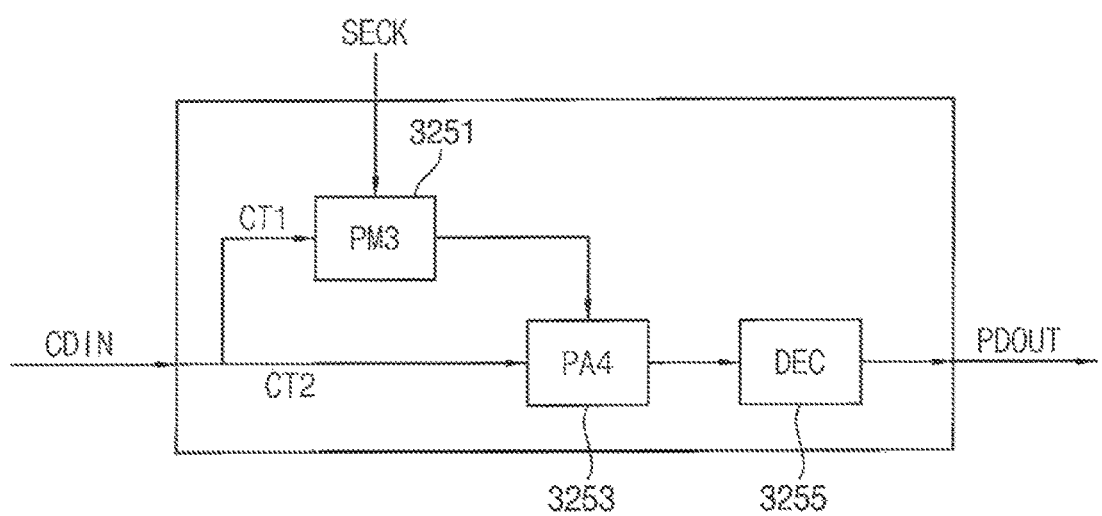
FIG. 8 is a block diagram illustrating an embodiment of a decryption circuit illustrated in FIG. 5.

FIG. 8 is a block diagram illustrating an embodiment of a decryption circuit illustrated in FIG. 5.

Referring to FIG. 8, the decryption circuit 3250 includes a polynomial multiplier (PM3) 3251, a polynomial adder (PA4) 3253 and a decoder (DEC) 3255.

The decryption circuit 3250 receives homomorphic ciphertext data CDIN and a secret key SECK. In some embodiments, the number of homomorphic ciphertext data CDIN may be plural, the homomorphic ciphertext data CDIN may include first homomorphic ciphertext data CT1 and second homomorphic ciphertext data CT2.

The polynomial multiplier 3251 receives the first homomorphic ciphertext data CT1 and the secret key SECK and provides a result of performing a polynomial multiplication operation to the polynomial adder 3253.

The polynomial adder 3253 receives the second homomorphic ciphertext data CT2 and the result of the operation performed by the polynomial multiplier 3251 and provides the result of performing the polynomial addition operation to the decoder 3255.

The decoder 3255 receives and decodes the result of the operation performed by the polynomial adder 3253 and provides the result data of the decoding as plaintext data PDOUT. That is, the plaintext data PDOUT may be generated according to Equation 6 below.

$$PDOUT=DEC(CT1*SECK+CT2) \quad \text{[Equation 6]}$$

In Equation 6, the DEC( ) is a decoding function.

Figure 9:
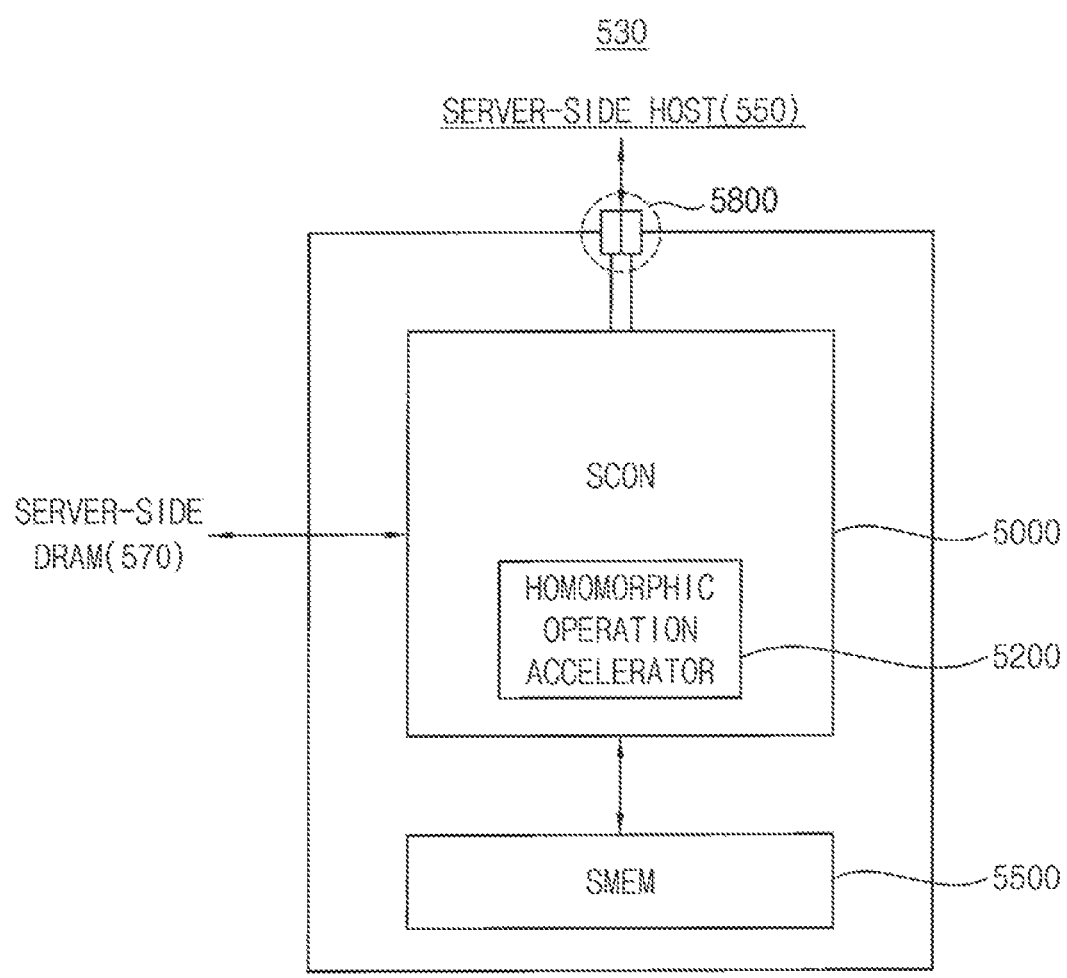
FIG. 9 is a block diagram illustrating an embodiment of a server-side storage device illustrated in FIG. 1.

FIG. 9 is a block diagram illustrating an embodiment of a server-side storage device illustrated in FIG. 1.

Referring to FIG. 9, the server-side storage device 530 includes the SCON 5000, the SMEM 5500 and a connector 5800.

The storage controller 5000 overall controls the server-side storage device 530 under the control of the server-side host device 550. In some embodiments, the storage controller 5000 controls a read operation and a write operation for the storage memory 5500 or the server-side DRAM 570. However, the scope of the example embodiments is not limited thereto. In some embodiments, the storage controller 5000 may control homomorphic operations. The storage controller 5000 may control a Number Theory Transform (NTT), an Inverse Number Theory Transform (INTT), a matrix vector multiplication, a modular polynomial multiplication and a modular polynomial addition. In some embodiments, the NTT operation may be an operation performed on each of the homomorphic ciphertext data to perform the homomorphic multiplication. The matrix vector multiplication may be an operation performed to perform point-wise multiplication on data resulting from the NTT operation. The INTT operation may be performed on a result of performing the point-wise multiplication. The modular polynomial multiplication may be an operation performed on each of the homomorphic ciphertext data to perform the homomorphic multiplication. The modular polynomial addition may be an operation performed on each of the homomorphic ciphertext data to perform the homomorphic addition.

In some embodiments, when a read request is issued from the server-side host device 550, the storage controller 5000 may read read-requested data from the storage memory 5500 or the server-side DRAM 570, and when a write request is issued from the server-side host device 550, the storage controller 5000 may write write-requested data in the storage memory 5500 or the server-side DRAM 570.

In some embodiments, the storage controller 5000 may be connected to the server-side host through a connector 5800.

The storage memory 5500 or the server-side DRAM 570 stores write data transmitted from the server-side host device 550 under the control of the storage controller 5000.

The storage controller 5000 further includes a homomorphic operation accelerator 5200. The homomorphic operation accelerator 5200 may perform a homomorphic operation between homomorphic ciphertext data and generate homomorphic ciphertext data on which the homomorphic operation is performed as a result of the homomorphic operation. Hereinafter, it will be described in more detail.

Figure 10:
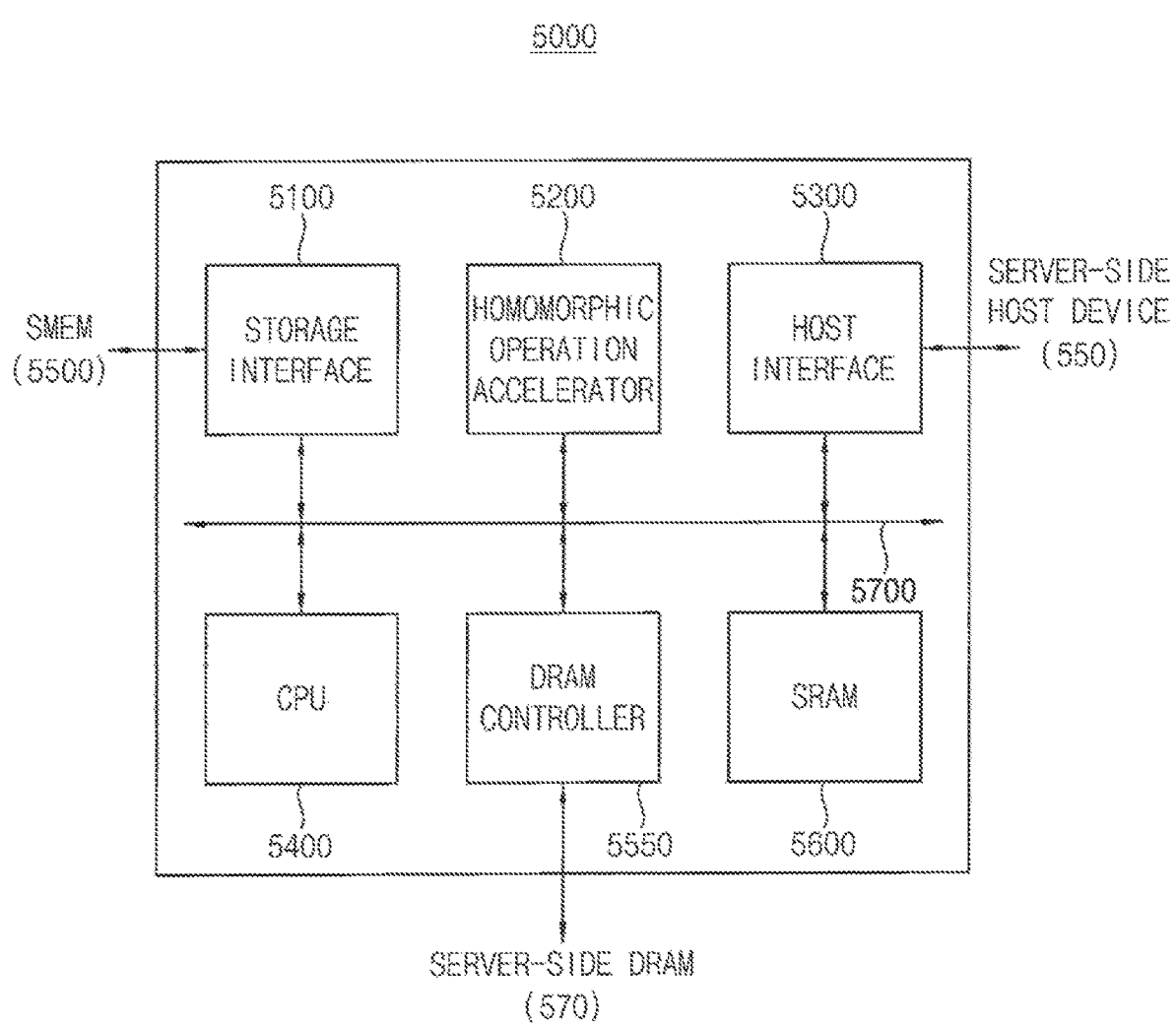
FIG. 10 is a block diagram illustrating an embodiment of a storage controller of FIG. 9.

FIG. 10 is a block diagram illustrating an embodiment of a storage controller of FIG. 9.

Referring to FIGS. 9 and 10, the storage controller 5000 includes a storage interface 5100, a homomorphic operation accelerator 5200, a host interface 5300, a processor (Central Processing Unit)(CPU) 5400, a DRAM controller 5550, an SRAM 5600 and a main bus 5700.

The storage interface 5100 performs communication between the storage controller 5000 and the storage memory 5500. The host interface 5300 performs communication between the storage controller 5000 and the server-side host device 550. The main bus 5600 performs communication between components 5100, 5200, 5300, 5400, 5550 and 5600 included in the storage controller 5000.

The homomorphic operation accelerator 5200 receives homomorphic ciphertext data. The homomorphic operation accelerator 5200 may perform a homomorphic operation between received homomorphic ciphertext data and generate homomorphic ciphertext data on which the homomorphic operation is performed as a result of the homomorphic operation. In some embodiments, the homomorphic operation accelerator 5200 may further receive a ciphertext operation level. The ciphertext operation level represents the maximum number of times the multiplication operation may be performed between the homomorphic ciphertext data without a bootstrapping process.

The processor 5400 controls a read operation and a write operation for the storage memory 5500, and may perform the NTT, the INTT, the matrix vector multiplication, the modular polynomial multiplication and the modular polynomial addition described above with reference to FIG. 9. However, the scope of the example embodiments is not limited thereto. The NTT, the INTT, the matrix vector multiplication, the modular polynomial multiplication and the modular polynomial addition may be independently performed by a separate module distinguished from the processor 5400.

Figure 11:
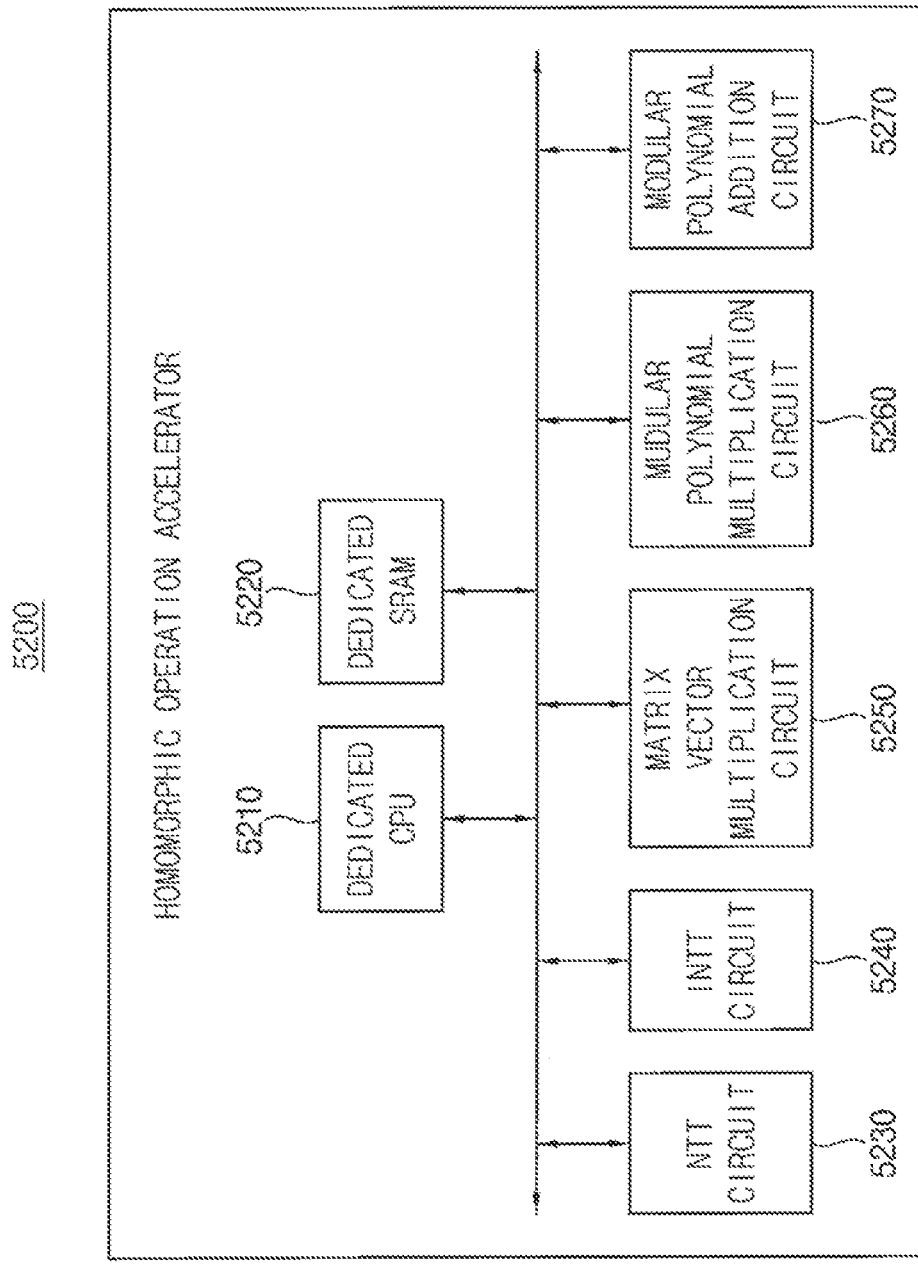
FIG. 11 is a block diagram illustrating an embodiment of a homomorphic operation accelerator of FIG. 10.

FIG. 11 is a block diagram illustrating an embodiment of a homomorphic operation accelerator of FIG. 10.

Referring to FIG. 11, the homomorphic operation accelerator 5200 includes a dedicated processor (dedicated central processing unit) (dedicated CPU) 5210, a dedicated memory (dedicated SRAM) 5220, an NTT circuit 5230, and an INTT circuit 5240, a matrix vector multiplication circuit 5250, a modular polynomial multiplication circuit 5260 and a modular polynomial addition circuit 5270.

The dedicated processor 5210 overall controls the components 5210, 5220, 5230, 5240, 5250, 5260 and 5270 of the homomorphic operation accelerator 5200. The dedicated processor 5210 may be implemented in the homomorphic operation accelerator 5200 separately from the processor 5400 included in the storage controller 5000. In some embodiments, the dedicated processor 5210 may be a digital signal processor (DSP). In this case, the dedicated processor 5210 may perform a floating-point operation in parallel with a high level. However, the scope of the example embodiments is not limited thereto. The dedicated processor 5210 may be one of a micro processor, an application processor or an ARM processor.

The dedicated memory 5220 temporarily stores result data according to the operation of the NTT circuit 5230, the INTT circuit 5240, the matrix vector multiplication circuit 5250, the modular polynomial multiplication circuit 5260 and the modular polynomial addition circuit 5270.

The NTT circuit 5230, the INTT circuit 5240, the matrix vector multiplication circuit 5250, the modular polynomial multiplication circuit 5260 and the modular polynomial addition circuit 5270 may perform homomorphic operations between homomorphic ciphertext data or may perform operations in an intermediate step to perform the homomorphic operation.

Figure 12:
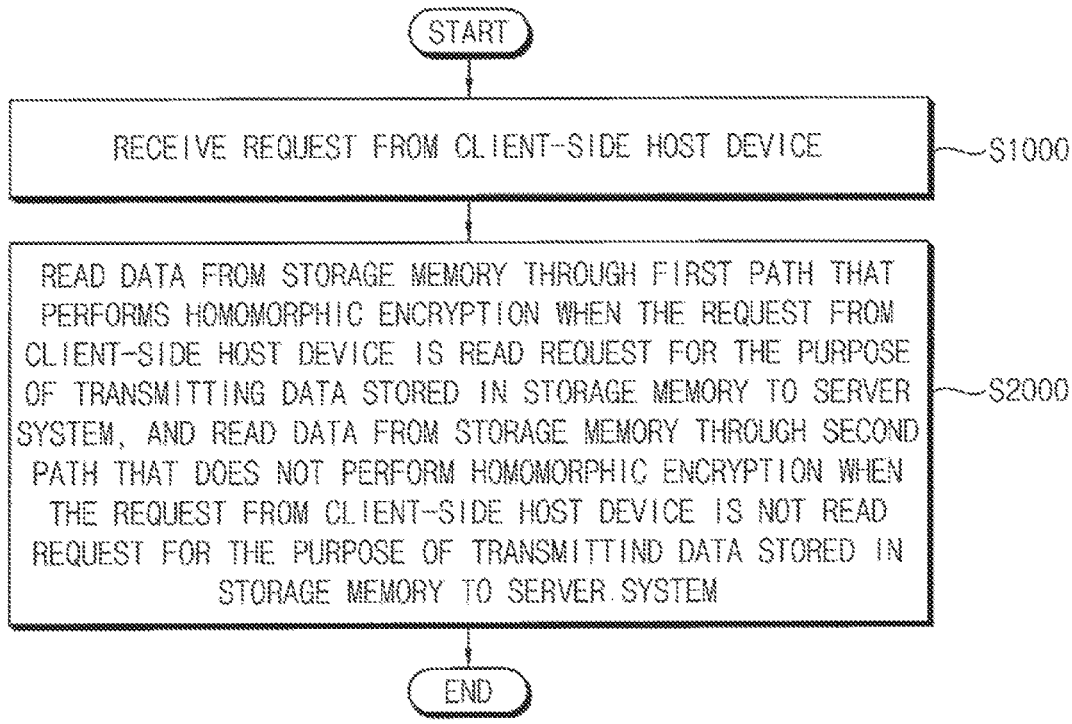
FIG. 12 is a flowchart illustrating an embodiment of a method of operating a storage controller included in a client-side storage device illustrated in FIG. 1.

FIG. 12 is a flowchart illustrating an embodiment of a method of operating a storage controller included in a client-side storage device illustrated in FIG. 1.

Referring to FIGS. 1 and 12, in the method of operating the storage controller, a request is received from the client-side host device 350 (S1000).

The request received from the client-side host device 350 may be either a read request or a write request. However, the scope of the example embodiments is not limited thereto. In some embodiments, the request received from the client-side host device 350 may be a request for controlling a program error, a program/erase error of data stored in the storage memory 3500, an error that occurs due to leakage of charge stored in a floating gate and a read error. The memory error control operation refers to an operation of controlling a program error, a program/erase error of data stored in the storage memory 3500, an error occurring due to leakage of electric charges stored in the floating gate and a read error. The randomizer refers to an operation of mitigating a reduction in reliability due to a back pattern dependency or a coupling phenomenon when data stored in the storage memory 3500 exhibits a regular pattern or data exhibits a continuous pattern. The read level control refers to an operation of controlling an error occurring according to a read method of data stored in the storage memory 3500. The other signal processing operations may include a coded modulation for improving reliability of the storage memory 3500.

When a request from the client-side host device 350 is a read request for the purpose of transmitting data stored in the storage memory 3500 to the server system 500, the data is read from the storage memory 3500 through a first path that performs a homomorphic encryption, and when the request from the client-side host device 350 is not a request for the purpose of transmitting data stored in the storage memory 3500 to the server system 500, the data is read from the storage memory 3500 through a second path that does not perform the homomorphic encryption (S2000).

In some embodiments, the second path may include a case in which data transmitted from the storage memory 3500 stays in the storage controller 3000 without being transmitted to the client-side host device 350. In addition, the second path may also include a case in which data transmitted from the client-side host device 350 stays in the storage controller 3000 without being transmitted to the storage memory 3500.

In some embodiments, the first path may be a path generated when the client-side host device 350 issues a read request to the storage controller 3000 for the purpose of transmitting data stored in the storage memory 3500 to outside of the client-side storage device 330. In the opposite interpretation, the path A may be a path generated when the client-side host device 350 issues a read request to the storage controller 3000 for the purpose other than the purpose of transmitting data stored in the storage memory 3500 to outside of the client-side storage device 330.

In some embodiments, the order in which the first path passes through the homomorphic encryption and decryption accelerator 3200 among the components 3100, 3200, 3300, 3400, 3550 and 3600 may be just before the host interface 3300 performing communication between the storage controller 3000 and the client-side host device 350. In this case, on the first path, the homomorphic encryption and decryption accelerator 3200 may be adjacent to the host interface 3300.

As described above, the size of the homomorphic ciphertext data may be several tens of times larger than that of plaintext data. Therefore, when the storage controller 3000 performs other functions other than the homomorphic encryption and decryption performed by the homomorphic encryption and decryption accelerator 3200, the storage controller 3000 performs the other functions in the state of the plaintext data rather than the state of the homomorphic ciphertext data, thereby reducing the cost consumed for data transmission inside the storage controller 3000.

Figure 13:
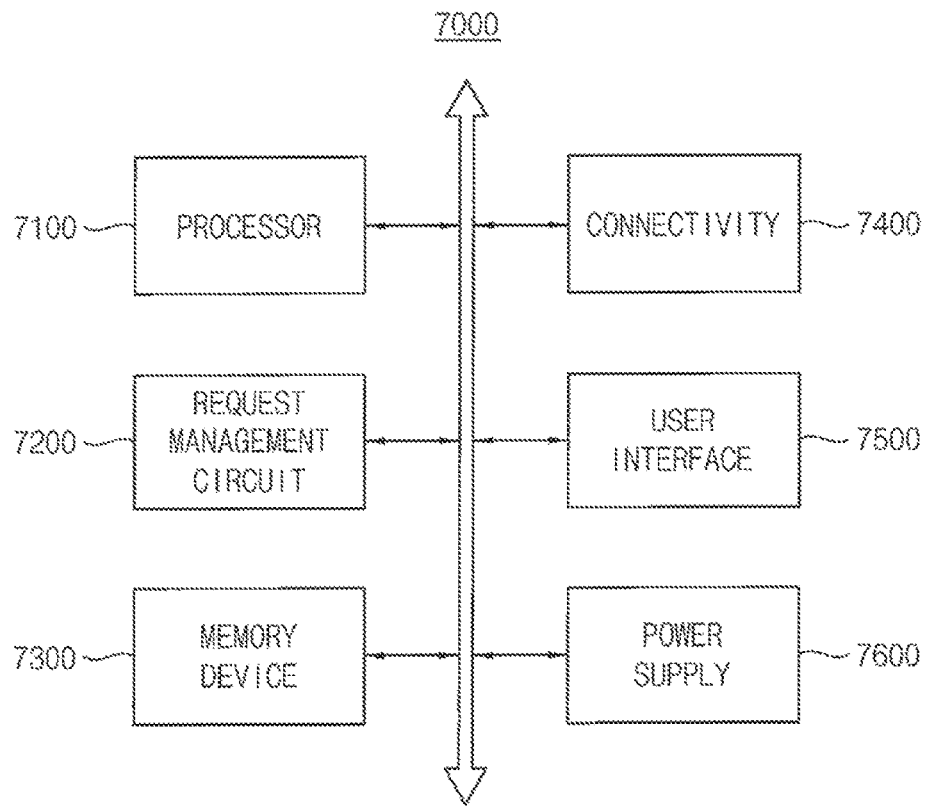
FIG. 13 is a block diagram illustrating a client system according to example embodiments.

FIG. 13 is a block diagram illustrating a client system according to example embodiments.

Referring to FIG. 13, a client system 7000 includes a processor 7100, a request management circuit 7200, a memory device 7300, a connectivity circuit 7400, a user interface 7500 and a power supply 7600. The client system 7000 may be any mobile system or computing system.

The processor 7100 controls the overall operation of the client system 7000, executes an operating system, an application, etc., and executes various computing functions such as calculations or tasks.

The connectivity circuit 7400 communicates with an external device. In some embodiments, the connectivity circuit 7400 may be configured to perform one or more communication among WiFi, WiFi Direct, Ethernet, Bluetooth, BLE (Bluetooth Low Energy), SPP (Serial Port Profile), Zigbee, infrared communication, Radio Control, UWM (Ultra-Wide Band), Wireless USB and NFC (Near Field Communication).

The memory device 7300 may include a memory controller and a nonvolatile memory. In some embodiments, the memory controller may be the storage controller 3000 or 5000 illustrated in FIGS. 1 to 4, 9 and 10, and the nonvolatile memory may be the storage memory 3500 or 5500 illustrated in FIGS. 1, 2 and 8. In some embodiments, the nonvolatile memory may be implemented as an EEPROM, a Flash memory, a MRAM (Magnetic RAM), a Spin-Transfer Torque MRAM, a FeRAM (Ferroelectiric RAM), a PRAM (Phase change RAM), a RRAM (Resistive RAM), a nanotube RRAM, a Polymer RAM, a Nano Floating Gate Memory, a holographic memory, a Molecular Electronics Memory Device or an Insulator Resistance Change Memory.

The user interface 7500 may include one or more input devices such as keypads, buttons, microphones, and touch screens, and/or one or more output devices such as speakers and display devices. In some embodiments, a user may input or check plaintext through the user interface 7500.

The power supply 7600 may supply an operating voltage of the client system 7000.

Figure 14:
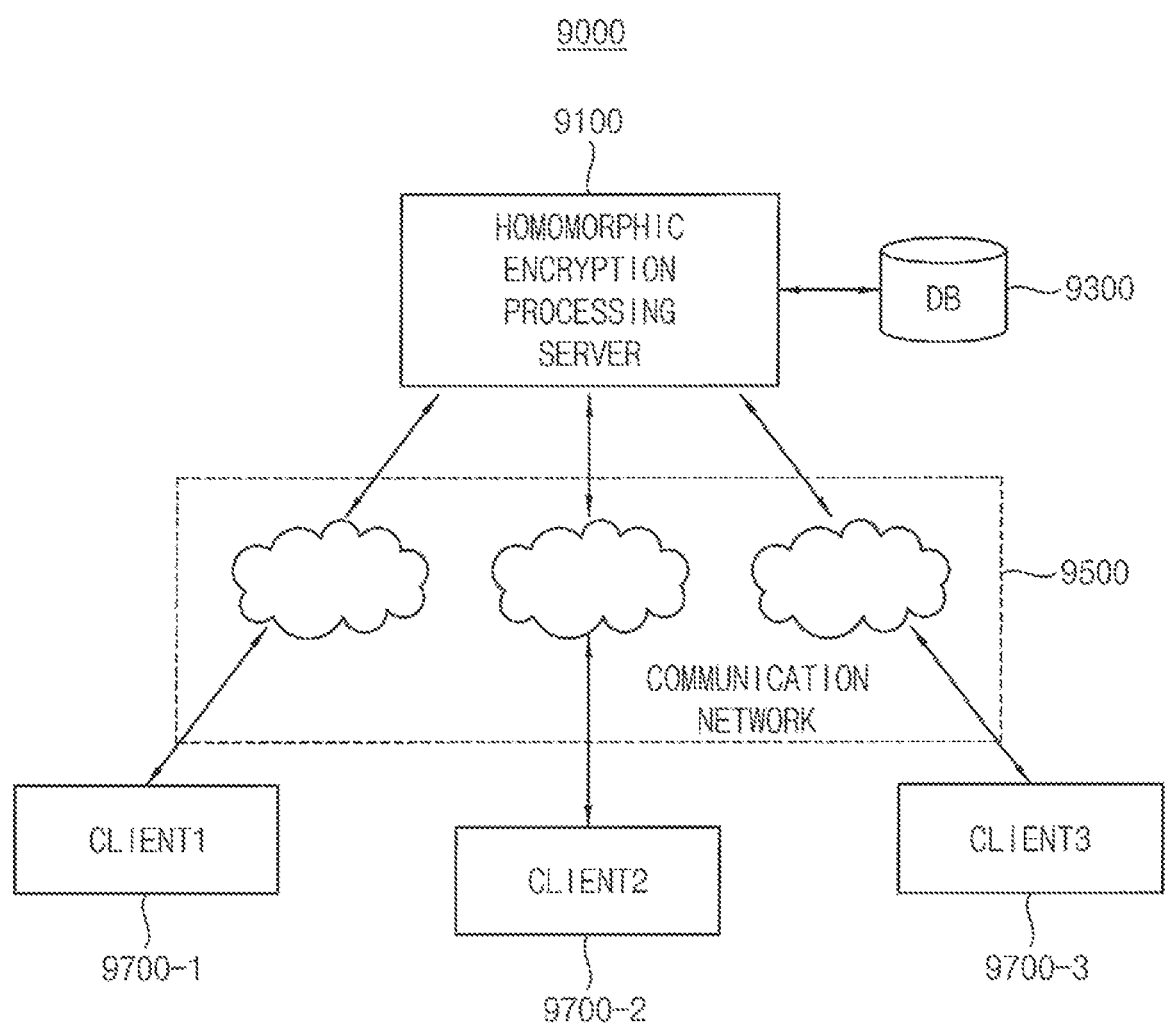
FIG. 14 is a block diagram illustrating a plurality of client systems and a server system including a storage controller according to example embodiments.

FIG. 14 is a block diagram illustrating a plurality of client systems and a server system including a storage controller according to example embodiments.

Referring to FIG. 14, a system 9000 may include a homomorphic encryption processing server system 9100, a database 9300, a communication network 9500 and client systems (client1, client2 and client3) 9700-1, 9700-2 and 9700-3.

The homomorphic encryption processing server system 9100 and the client systems 9700-1, 9700-2 and 9700-3 may include any one or any combination of the homomorphic encryption and decryption accelerator illustrated in FIGS. 2 and 3 or the homomorphic operation accelerator illustrated in FIGS. 8 and 9.

The client systems 9700-1, 9700-2 and 9700-3 are computing devices or communication terminals having a communication function and may be a mobile phone, a smart phone, a tablet PC, a mobile internet device (MID), an internet tablet, an Internet of Things (IoT) device or a wearable computer, but the scope of the example embodiments is not limited thereto.

The communication network 9500 includes a local area network (LAN), a wide area network (WAN), an Internet (WWW: World Wide Web), a wired/wireless data communication network, a telephone network, a wired/wireless television communication network, and the like.

The wireless communication network may be one of 3G, 4G, 5G, 3GPP (3rd Generation Partnership Project), LTE (Long Term Evolution), WIMAX (World Interoperability for Microwave Access), WiFi (Wi-Fi), Bluetooth communication, infrared communication, ultrasonic communication, Visible light communication (VLC: Visible Light Communication) and Li-Fi (LiFi), but the scope of the example embodiments is not limited thereto.

As described above, the storage controller, the system including the storage controller and a method of operating the storage controller according to example embodiments perform the homomorphic encryption, the homomorphic decryption and the homomorphic operation. In this case, because the public key, the secret key, and the other parameters in performing the homomorphic encryption technology are not leaked to outside of the client-side storage device, the security of the system performing the homomorphic encryption technology may be strengthened. In addition, by minimizing the number of times of transmission of the homomorphic ciphertext data having an increased size, the burden associated with the transmission of the homomorphic ciphertext data may be reduced.

The storage controller and, the client system and the server system including the storage controller according to example embodiments may be widely applied in various application fields to which homomorphic encryption technology is applied. In addition, the example embodiments may be more usefully applied to a computer, a laptop, a cellular phone, a smart phone, a MP3 player, a Personal Digital Assistants (PDA), a portable multimedia device player (PMP), a digital TV, a digital camera, portable game console, a navigation device, a wearable device, a IoT (Internet of Things) device, a IoE (Internet of Everything) device, an electronic systems such as e-books, virtual reality (VR) devices and augmented reality (AR) devices to which homomorphic encryption technology is applied.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the example embodiments disclosed, and that modifications to the disclosed example embodiments, as well as other example embodiments, are intended to be included within the scope of the appended claims.

What is claimed is:

1. A client system comprising:
a client-side host device; and
a client-side storage device comprising a storage controller and a storage memory,
wherein the storage controller comprises:
   a host interface;
   a processor configured to control a read operation and a write operation for the storage memory; and
   a homomorphic encryption and decryption accelerator configured to,
      based on a read request being for transmitting data to a server system, read first plaintext data from the storage memory through a first path,
wherein the storage controller is configured to, based on the read request not being for transmitting the data to the server system, read the first plaintext data through a second path different from the first path, and
wherein the second path does not pass through the homomorphic encryption and decryption accelerator.

2. The client system of claim 1, wherein the first path passes through the homomorphic encryption and decryption accelerator.

3. The client system of claim 1, wherein the homomorphic encryption and decryption accelerator is adjacent to the host interface on the first path.

4. The client system of claim 1, wherein the homomorphic encryption and decryption accelerator comprises:

an encryption circuit configured to perform the homomorphic encryption;
a decryption circuit configured to perform the homomorphic decryption;
a key generation circuit configured to generate a public key and a secret key; and
a parameter generation circuit configured to generate parameters.

5. The client system of claim 4, wherein the encryption circuit is further configured to:
receive the first plaintext data;
receive the public key from the key generation circuit; and
receive the parameters from the parameter generation circuit.

6. The client system of claim 5, wherein the parameters are related to an encoding, a decoding, a multi-message packing, the homomorphic encryption, the homomorphic decryption and a key generation.

7. The client system of claim 4, wherein the decryption circuit is further configured to:
receive second homomorphic ciphertext data; and
receive the secret key from the key generation circuit.

8. The client system of claim 4, wherein the parameter generation circuit is further configured to generate the parameters that are used in the homomorphic encryption and the homomorphic decryption.

9. The client system of claim 8, wherein the parameter generation circuit is further configured to determine the parameters, based on a homomorphic encryption scheme that is used in the homomorphic encryption and the homomorphic decryption.

10. The client system of claim 9, wherein the homomorphic encryption scheme comprises one among a partial homomorphic encryption, a somewhat homomorphic encryption and a fully homomorphic encryption.

11. The client system of claim 4, wherein the parameter generation circuit comprises a linear feedback shift register and a reference lookup table.

12. A storage controller comprising:
a host interface;
a processor configured to control a read operation and a write operation for a storage memory; and
a homomorphic encryption and decryption accelerator configured to, based on a read request being for transmitting data to a server system, read first plaintext data from the storage memory through a first path,
wherein the storage controller is configured to, based on the read request not being for transmitting the data to the server system, read the first plaintext data through a second path different from the first path, and
wherein the second path does not pass through the homomorphic encryption and decryption accelerator.

13. The storage controller of claim 12, wherein the first path passes through the homomorphic encryption and decryption accelerator.

14. The storage controller of claim 12, wherein the homomorphic encryption and decryption accelerator is adjacent to the host interface on the first path.

15. A method of operating a storage controller, the method comprising:
receiving, by a homomorphic encryption and decryption accelerator, a read request from host device;
based on the read request received from the host device being for transmitting data that is stored in a storage memory to a server system, reading, by the homomorphic encryption and decryption accelerator, the data from the storage memory through a first path that performs homomorphic encryption; and
based on the read request received from the host device not being for transmitting the data to the server system, reading, by the storage controller, the data from the storage memory through a second path that does not perform the homomorphic encryption.

16. The method of claim 15, wherein the first path passes through the homomorphic encryption and decryption accelerator, and
wherein the second path is a transmission path does not pass through the homomorphic encryption and decryption accelerator.

17. The method of claim 15, wherein the storage controller comprises a host interface for communicating with the host device, and
wherein the homomorphic encryption and decryption accelerator is adjacent to the host interface on the first path.

18. The method of claim 17, wherein the homomorphic encryption and decryption accelerator comprises:
an encryption circuit configured to perform the homomorphic encryption;
a decryption circuit configured to perform homomorphic decryption;
a key generation circuit configured to generate a public key and a secret key; and
a parameter generation circuit configured to generate parameters.

* * * * *